(12) United States Patent
Bugiolacchio et al.

(10) Patent No.: US 10,519,294 B2
(45) Date of Patent: Dec. 31, 2019

(54) SELF-CLEANING COMPOSITE MATERIAL FOR PRODUCING MOLDED KITCHEN AND BATHROOM INTERIOR DECORATION ITEMS

(71) Applicant: DELTA SRL, Montecassiano (IT)

(72) Inventors: Antonio Bugiolacchio, Recanati (IT); Maria Savina Pianesi, Macerata (IT); Samuele Rossini, Castelfidardo (IT)

(73) Assignee: DELTA SRL, Montecassiano (MC) (IT)

( * ) Notice: Subject to any disclaimer, the term of this patent is extended or adjusted under 35 U.S.C. 154(b) by 73 days.

(21) Appl. No.: 15/570,170

(22) PCT Filed: May 2, 2016

(86) PCT No.: PCT/EP2016/059737
§ 371 (c)(1),
(2) Date: Oct. 27, 2017

(87) PCT Pub. No.: WO2016/177662
PCT Pub. Date: Nov. 10, 2016

(65) Prior Publication Data
US 2018/0127563 A1 May 10, 2018

(30) Foreign Application Priority Data

May 6, 2015 (IT) .................. 102015000014119

(51) Int. Cl.
| | | |
|---|---|---|
| *C08K 3/22* | (2006.01) | |
| *C08K 5/00* | (2006.01) | |
| *C08K 5/103* | (2006.01) | |
| *C08K 5/5415* | (2006.01) | |
| *C08F 2/01* | (2006.01) | |
| *C08K 3/08* | (2006.01) | |
| *C08L 67/06* | (2006.01) | |

(52) U.S. Cl.
CPC .................. *C08K 3/22* (2013.01); *C08F 2/01* (2013.01); *C08K 3/08* (2013.01); *C08K 5/0025* (2013.01); *C08K 5/103* (2013.01); *C08K 5/5415* (2013.01); *C08L 67/06* (2013.01); C08K 2003/0812 (2013.01); C08K 2003/2227 (2013.01); C08K 2003/2241 (2013.01); C08K 2201/005 (2013.01)

(58) Field of Classification Search
CPC .......... C08K 3/08; C08K 3/22; C08K 5/0025; C08K 5/103; C08K 5/5415; C08F 2/01; C08L 67/06
See application file for complete search history.

(56) References Cited

FOREIGN PATENT DOCUMENTS

WO WO2013017651 * 2/2013

* cited by examiner

*Primary Examiner* — Edward J Cain
(74) *Attorney, Agent, or Firm* — Egbert, McDaniel & Swantz, PLLC

(57) ABSTRACT

A self-cleaning composite material including the following composition: 50%-85% in weight of alumina trihydrate (ATH)-based mineral charges; 10%-30% of cross-linking polymer comprising polyester resin; photocatalytic Titanium Dioxide (TiO2) dispersed in the cross-linking polymer in a weight percentage from 0.05% to 5% with respect to the weight of the cross-linking polymer; compatibilizing agent for anchoring between the photocatalytic TiO2 and the cross-linking polymer, wherein the anchoring compatibilizing agent of the TiO2 is silane; and cross-linking monomers in order to obtain the reticulation of the cross-linking polymer by thermal or chemical polymerization.

13 Claims, 4 Drawing Sheets

SELF-CLEANING COMPOSITE MATERIAL FOR PRODUCING MOLDED KITCHEN AND BATHROOM INTERIOR DECORATION ITEMS

The present patent application for industrial invention relates to a self-cleaning composite material for producing molded kitchen and bathroom interior decoration items in general, such as sinks, worktops, washbasins, bathtubs, interior decoration articles and the like.

The WO2013/017651 patent application in the name of the same applicant discloses a self-cleaning composite material having a composition that comprises quartz-based mineral charges and photocatalytic nanometric titanium dioxide ($TiO_2$) mixed in a methacrylic syrup containing metylmethacrylate MMA and polymethyl methacrylate PMMA. Such a composition is mixed with some mineral charges and other chemicals and the obtained mixture is cast or injected in a mold in order to obtain the finished product by means of polymerization.

The aforementioned patent application WO2013/017651, which uses quartz-based mineral charges and a methacrylic syrup composed of one monomer and one polymer, discloses a material that is used also in kitchen applications that require a high mechanical resistance because the surface undergoes high mechanical, chemical and physical stress caused by kitchen tools, such as pans, cutting boards, knives and cutlery. Nevertheless, the product obtained according to WO2013/017651 has the typical characteristics of thermohardening materials; surfaces and shapes are given during molding when the liquid mixture is polymerized and becomes a solid composite.

The surfaces of the product are perfectly homogeneous and the product is ready for use, without the need of any additional treatment. However, no repairing or polishing operations are possible after the product is extracted from the mold. Drilling or cutting operations must be carried out with machines provided with industrial diamond tools with MOHS 10 hardness, because they must have a hardness higher than quartz, which has a MOHS hardness of approximately 7.

Consequently, the quartz mineral charges make the final product extremely hard, not malleable and with complex moldeability. The term "moldeability" indicates a transformation of the resin into composite according to the prior art. Manufacturers of molded products made of hard materials use quartz as mineral charge because the surface must withstand impacts, shocks, and surface scratching. Therefore, if the final product is damaged or faulty, it cannot be repaired.

The methacrylic syrup that contains MMA requires a complex molding know-how; in fact, special molds and a delicate molding process must be used.

Moreover, because of the presence of crosslinkers, the mixture of quartz mineral charges and methacrylic syrup that contains MMA generates high chemical bonds and a high reticulation of the mineral charges of quartz, which is highly cross-linked, thus making the final product non-thermoformable or workable.

The purpose of the present invention is to eliminate the drawbacks of the prior art by providing a self-cleaning composite material used to produce kitchen and bathroom interior decoration products, which is sufficiently soft and formable in such manner to be easy to work and repair.

Another purpose of the invention is to provide a self-cleaning composite material that is easily thermoformable and moldable with especially simple molds and a simple molding process.

Another purpose of the present invention is to provide a self-cleaning composite material that is intrinsically photocatalytic, effective, efficacious, and at the same time environmental friendly and non-toxic for man and the environment.

These purposes are achieved according to the invention with the characteristics of the independent claim 1.

In this description percentages are considered as weight percentages with respect to the final product, except when the percentage ratio is indicated.

The composite material according to the present invention has the following composition:

50-85% in weight of mineral charges with alumina trihydrate (ATH) base with size comprised between 10 and 50 micron, 10-30% of polyester resin;

photocatalytic Titanium Dioxide ($TiO_2$) dispersed in the methacrylic syrup in a weight percentage of 0.05-5% with respect to the weight of the polyester resin;

compatibilizing agent, such as silane, to anchor the photocatalytic $TiO_2$ to the polyester resin; and cross-linking monomers to obtain the reticulation of the polyester resin or mixture.

Preferably, a polyester resin is exclusively used. In fact, polyester resin can be polymerized easily at ambient temperature with known catalysts. The molding process of polyester resins is simple and requires simple inexpensive molds.

After making some experimental tests, the applicant found out that a reticulation of the $TiO_2$ is obtained also with polyester resin. Moreover, polyester resin is stable and remains stable also after adding TiO2.

Advantageously, a polyester resin of POLYLITE 32166-16 REICHHOLD type is used. POLYLITE® 32166 is a polyester resin with an isophthalic acid and neopentyl glycol base, with low viscosity, a high content of solids and a low content of styrene. POLYLITE® 32166 polyester resins are casting resins developed for producing materials that do not need to be covered with gel coat. These resins are rigid, with medium reactivity and low viscosity. They are UV-stabilized. POLYLITE® 32166 polyester resin withstands the deterioration caused by water, has a good resistance to stains, a very high temperature at heat deformation, high thermal-shock performance, and high resistance to many organic and inorganic solutions and solvents.

A mixture of polyester resin and metylmethacrylate (MMA) can be used instead of polyester resin.

Polyester resin has a poor resistance to light, and tends to turn yellow after a long exposure to UV radiation. The addition of an MMA percentage (0.5-15%) to polyester resin reduces or almost eliminates this phenomenon.

The use of MMA in polyester makes the structure of the composite more performing in terms of mechanical characteristics. Moreover, the use of MMA reduces the post-curing time of the polyester product because MMA considerably enhances cross-linking during polymerization, more than styrene that is normally used in polyester resins.

However, the weight percentage of MMA in the mixture must be lower than 15% with respect to the total weight of the mixture. Therefore, the amount of polyester resin must be higher than 85% with respect to the total weight of the mixture. This guarantees the aforementioned advantages, which are related to the polyester resin.

Alumina trihydrate (ATH) has a MOHS hardness that is lower than 5, thus making the final product sufficiently soft, malleable, reparable and workable just like wood, that is to say by means of the tools that are ordinarily used by a carpenter. In view of the above, if the final product is damaged, said damage can be repaired with a mechanical operation, such as abrasion and filling with a special glue that can be sandblasted and polished after hardening, thus perfectly repairing the damaged, cracked or faulty part.

Alumina trihydrate (ATH) must have a size of 10-50 microns in order to have a homogeneous, compact material with rheology suitable for low pressure casting in a mold, without sedimentation or sedimentation gradients of the mineral charge.

Although TiO2 creates an efficacious reticulation with the polyester resin, it was necessary to check whether, when using ATH, said reticulation does not prevent thermoformability and easy repairness of the final product with suitable glues or fillers. Experimental tests showed that the final product obtained after molding is still thermoformable.

Optionally, mineral charges of siliceous type ($SiO_2$) with size lower than 0.1 mm can be added to the composition in a quantity comprised between 2% and 15% with respect to the composition. For example, cristobalite, calcium silicate, wollastonite and/or feldspars, full and hollow (enlightened) glass microspheres can be used amongst mineral charges of siliceous type ($SiO_2$).

The non-metalliferous mineral charges that can be used include white talcum, quartz sand, siliceous sand, carbonate sand, calcium carbonate, marble granulates, ventilated quartz, barites, kaolins, hydrated alumina, hydrated calcium borate, alumina trihydrate, micas, aluminum oxides, aluminum sesquioxyde, magnesium oxides, wollastonite, feldspar, virgin ground glass, and full and hollow (enlightened) glass microspheres.

Moreover, virgin or recovered mineral charges can be added. The recovery of mineral charges derives from charges coming either from processing ATH materials, quartz ceramic and recovery glass or from ground sinks scrap.

A dispersion is obtained from mixing the materials of the composition, which contains photocatalytic nanometric TiO2 that is chemically and intimately bond to the composition structure, thus making the entire dispersion photocatalytic both superficially and inside.

The product obtained by polymerizing said dispersion is a composite of polyester resin charged with a soft mineral charge (MOHS hardness lower than 5). Such product is a highly innovative product with no precedents on the market until now, because it is a soft product that can be easily worked, repaired and thermoformed, in addition to having exceptional intrinsic photocatalytic properties.

It must be considered that polyester resin does not require any special molding know-how or skills because this technology has been studied and used for many years. Polyester resin molding makes use of simple systems and known catalysts. The molds used to process said polyester dispersions are very simple to make (using epoxy resin, or polyester resin or polyethylene with fiberglass reinforcements), not structured and advantageously inexpensive.

Using alumina trihydrate (ATH) as mineral charge, the final product is a composite that can be easily worked with ordinary carpenter's tools, such as saws; moreover, surfaces can be sandblasted or polished with ordinary sand-blasting and polishing papers. The surfaces can be cut, rounded, filled, polished, thermoformed, perforated, sandblasted and glued.

Being a ductile resin that is very easy to work, the product according to the present invention has unique properties that allow for making surfaces with no junctions or with almost imperceptible junctions. It is pleasant to see and warm to touch, with a velvety surface. Surfaces can be renewed and restored to their original aspect with an ordinary delicate abrasive detergent and an abrasive sponge. The surfaces can be sandblasted in matt version or polished with mirrored polished finish.

This material is easy and fast to maintain. It can be cleaned with soapy water or ordinary detergents to remove most stains or dirt deposited on its surface. Gel or abrasive detergents are recommended, rinsing the surface thoroughly, using an abrasive sponge; in this way, the original matt surface will be maintained. Being a homogeneous material in its entire thickness, it can be protected against surface aggressions, such as scratches, cigarette burning, and resistant stains, restoring the beauty of the original surface by simply following these instructions; small surface damage can be repaired with an abrasive sponge and an ordinary abrasive cleaner. By superficially polishing the damaged part, if the defect is still visible, the surface can be treated again with very fine sandblasting paper.

Additional features of the invention will appear clearer from the following description, which refers to the merely illustrative, not limiting embodiments shown in the examples and in the attached Figures, wherein.

The production process of the self-cleaning material provides for a first step in which the $TiO_2$ active principle is added to polyester resin. This step provides for an exclusive anchoring process, by means of covalent bond, of the $TiO_2$ active principle to the composite structure of the polyester resin, by means of a compatibilizing anchoring agent composed of the anchoring silanizing agent that determines the formation of the covalent bond between the photocatalytic $TiO_2$ and the polyester resin.

Silane is the cause of a silanization reaction that produces a covalent bond between $TiO_2$ and the polyester substrate. Such a bond guarantees the anchoring of the $TiO_2$ to the structure by means of a strong irreversible bond.

Silane is perfectly dispersed in the polyester resin by means of agitation at 900 rpm for 10 minutes. Successively, the photocatalytic $TiO_2$ is added to the polyester resin in order to obtain the best dispersion possible. Such a formulation is kept in dispersion with a screw agitator at a speed of 900 rpm for 2.5 hours. Then the speed is increased to 1800 rpm for 30 minutes, in such manner to guarantee a complete dispersion of the $TiO_2$ in the polyester resin.

The time necessary for the functionalization, that is to say for the silanization of the photocatalytic titanium, is approximately 3 hours. After such a reaction time the remaining components can be added.

Figure 1:
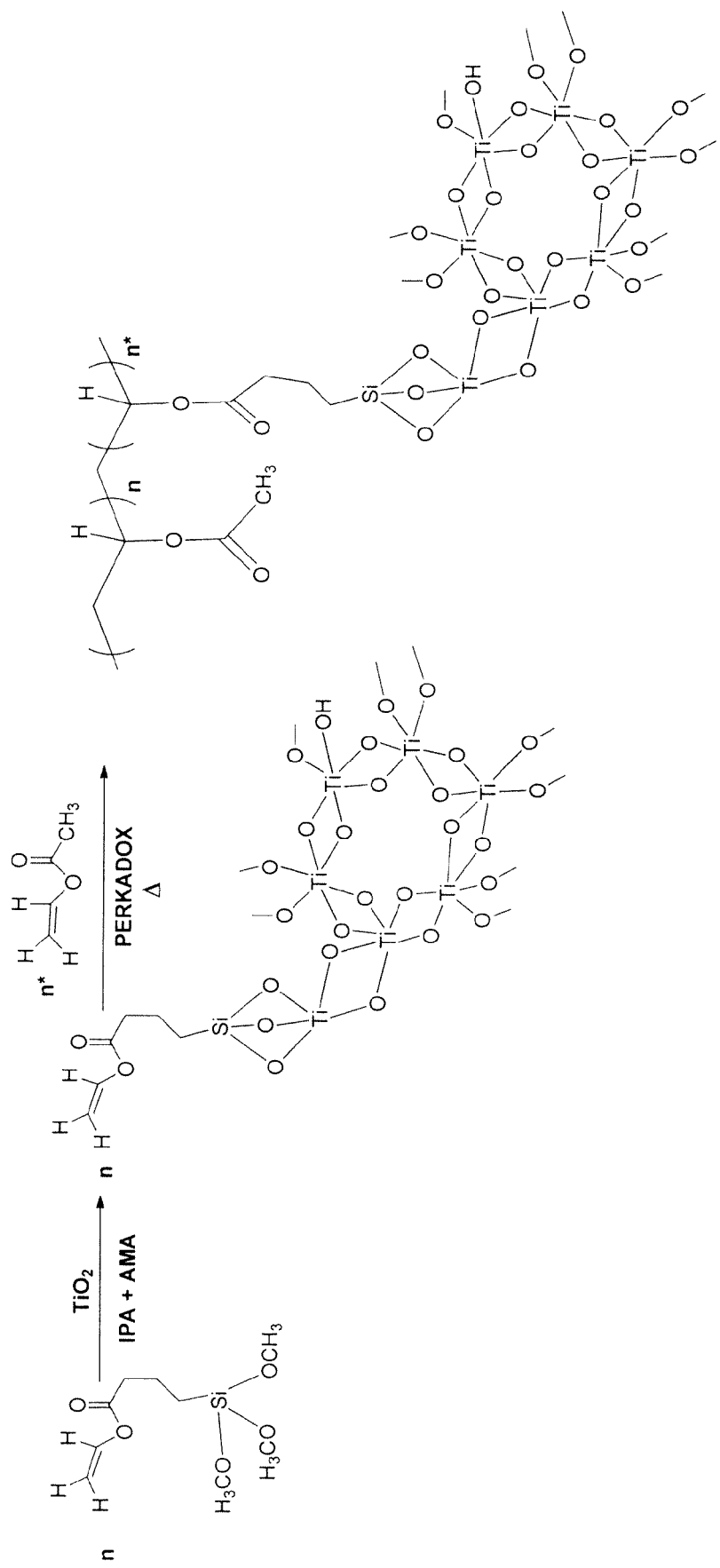
FIG. 1 shows the anchoring of $TiO_2$ to polyester resin.

FIG. 1 shows the anchoring of $TiO_2$ to the polyester resin.

All the other components are added after anchoring the $TiO_2$ to the silossanic function of the silane, starting from alumina trihydrate (ATH) mineral charges, followed by crosslinkers.

Such a charged dispersion is kept homogeneously in agitation with a screw agitator at a speed of 900 rpm for 2.5 hours and at a speed of 1800 rpm for 30 minutes.

The final dispersion is placed in a mold and polymerization is carried out either thermally or chemically at ambient temperature.

Thermally, the material is heated starting from an ambient temperature of 25-30° C. for a time comprised between 30 and 40 minutes, then the temperature is increased with heating ramps up to 100° C. and cooled according to the type of dispersion and to the thermostatation system of the mold.

Table 1 shows an example of a typical heating cycle for a strongly charged polyester dispersion.

TABLE 1

| TIME (min) | Temperature |
|---|---|
| 0 | 30° C. |
| 0-60 | 65° C. |
| For 8 hours | 100° C. |

Chemically, using the same formulation/chemical composition, polymerization occurs by means of a series of suitable catalysts that start the reaction at ambient temperature.

TBPM terbutyl peroxymaleate produced by Pergan PEROXAN PM-25

Ca(OH)2

THIOCURE® PETMP Pentaerythritol tetra (3-mercaptopropionate) produced by BRUNO BOCK.

The same aesthetic, mechanical and chemical results are achieved in the two different chemical and thermal polymerizations.

The polyester resins functionalized with photocatalytic $TiO_2$ showed excellent results in terms of degradation of various organic molecules, such as oleic acid and coloring agents, like eosin Y, methylene blue and red methyl. It was possible to obtain a charged polymeric material with self-cleaning surface by means of $TiO_2$ mass dispersion in presence of the 3-(trimethoxysilyl)propyl methacrylate silossanic function.

The silossanic group allows for anchoring $TiO_2$ to the polyester resin structure and at the same time acts as disgregating agent; in this way, $TiO_2$ is completely dispersed in the material both on the surface and in the mass.

The alumina trihydrate (ATH) mineral charge particles with size lower than 0.1 mm provide a suitable homogeneity to the dispersion composition and favor a homogeneous surface upon molding.

Advantageously, $TiO_2$ is in anatase form and in powder, with a nanometric grain size lower than 300 nm.

Advantageously, the polymeric part is only composed of polyester resin.

A methacrylic monomer, such as methyl methacrylate (MMA), can be added to the polyester resin, in weight percentage lower than 15% compared to the weight of the polyester resin and MMA mixture.

Preferably, the compatibilizing anchoring agent is silane, which is added to the mixture in a quantity equal to $TiO_2$; silane can be added up to a double quantity compared to $TiO_2$ in order to guarantee a complete disgregation of the photocatalyist ($TiO_2$).

If the compatibilizing agent is trimetoxisilane, silanization catalysts, isopropilamine (IPA) and methacrylic acid (AMA) are used in equal quantity.

The peculiarity of the invention is represented by the dispersion of photocatalytic titanium dioxide ($TiO_2$) inside the polyester resin and polyester with methyl methacrylate and mineral charge that is successively polymerized. For this reason, the following comparative studies and tests were made both on cross-linked resins and on resins containing the photocatalytic $TiO_2$, both after adding inorganic material, such as alumina trihydrate (ATH) mineral charges that represent the majority of the final product.

The photocatalytic degradation is exclusively carried out by the $TiO_2$ that is found on the surface of the polymeric material. $TiO_2$ is a heterogeneous catalyst that, when activated by light, can generate a series of oxigenated active species, such as $O_2.^-$, $.OH$, and $H_2O_2$, which are suitable for degrading most organic agents. Therefore, $TiO_2$ only acts as catalyst and does not participate in the degradation process directly.

Based on the above considerations, the preparation of the material functionalized with $TiO_2$ was carried out by mixing various organic components as indicated below:

Organic Part
methacrylic syrup: metylmethacrylate (MMA)/polymetylmethacrylate (PMMA) or
polyester resin of POLYLITE 32166-16 REICHHOLD type or
polyester resin of POLYLITE 32166-16 REICHHOLD type and methyl methacrylate MMA Cross-Linking Agents:
dietylenglicoledimethacrilate (EGDM);
tetraetylenglicoledimethacrilate (TEGDM);
trimetylolpropane trimethacrylate (TMPTMA);

Anchoring Molecule
3-metacriloxipropyltrimetoxisilane (SILANE);

Silanization Catalysts
isopropylamine (IPA);
methacrylic acid (AMA);

Releasing agents:
stearic acid;
Zn-stearate;

Families of Mineral Charges
Silicates (quartz, cristobalites, silicons, glass, glass full and/or empty enlightened glass microspheres), of either virgin or recovered type
Aluminas (alumina trihydrate ATH, aluminum oxides) of either virgin or recovered type.

Recovery can be of both internal and external type. It is of internal type by re-using ground sinks as GREEN recovery mineral charge or of external type by using mineral charges recovered from other industries, such as ceramic and mine industries instead of quartz, or ATH or other virgin mineral charges.

Following are three examples of the samples used for various comparative tests with the prior art. The sample compositions are characterized by a different content of organic part, mineral charges and $TiO_2$, but with the same amount of cross-linking agents and silane.

EXAMPLE 1 (PMMA/MMA (Syrup)+0.3% $TiO_2$+Quartz) (Composition Described in WO2013/017651)

The following components are mixed in a 1000 cc high-density polyethylene container using a screw agitator (speed from 900 to 1800 rpm):

305.00 grams of high-purity methyl methacrylate;
45 grams of methyl methacrylate polymer.

The mixture was agitated until the complete dissolution of the PMMA polymetylmethacrylate polymer was obtained.

Then the following components were added:
- 6 grams of silane DYNASYLAN MEMO 3 (Trimethoxysilyl)propyl methacrylate;
- 3 grams of $TiO_2$ P-25 produced by DEGUSSA;

Minimum mixing time is 2.5 hours and then the following components are added:
- 620.36 grams of quartz-type mineral charge with 0.1-0.6 mm size and white color
- 4.00, 3.00, 12.00 grams of cross-linking agents, respectively of EGDM-TEGDM-TMPTM;
- 0.60 grams of zinc stearate.

Variable quantities of methacrylic acid (AMA) and iso-propylamine (IPA) mixtures of 0.22 grams respectively were used as silanization catalysts.

Preparation is made by mixing the aforementioned components in the following order; firstly, methyl methacrylate is mixed with polymetylmethacrylate (PMMA). Then cross-linking agents (EGDM, TEGDM, TMPTM) and Zn-stearate are added and the dispersion is agitated for at least 2.5 hours. In this way, only the organic part is mixed, then DYNASYLAN MEMO (3-(Trimethoxysilyl)propyl methacrylate) is added, followed by the addition of P-25 $TiO_2$, AMA and IPA; in such way, it is guaranteed that the $TiO_2$ interacts with the silossanic function before adding the mineral charge which is provided in excess with respect to $TiO_2$; the Ti—O—Si bond is sufficiently strong and this excludes competition phenomena between quartz and the silossanic function (—$Si(OCH_3)_3$), thus guaranteeing the anchoring of the photocatalytic $TiO_2$ to the polymeric structure.

Then, the mineral charge and the Zn-stearate are added and the dispersion is agitated or rolled for at least 6 hours, which is the time needed by the recovery mineral charge for bonding with the silossanic functions that are still free.

Then, 0.5% of Perkadox 16 polymerization catalyst and 0.15% of stearic acid as releasing agent are added and the solution is agitated at 1800 rpm for 30 minutes.

The final dispersion is placed in a mold and polymerization is made thermally: the material is heated starting from an ambient temperature of 25-30° C., which is gradually increased with heating ramps up to 100° C. and cooled, for an average time comprised between 20 and 40 minutes according to the type of dispersion and to the thermostatation time of the mold.

Then, the mineral charge and the Zn-stearate are added and the dispersion is agitated or rolled for at least 6 hours, which is the time needed by the mineral charge for bonding with the silossanic functions that are still free.

Then, 0.5% of Perkadox 16 polymerization catalyst and 0.15% of stearic acid as releasing agent are added and the solution is agitated at 1800 rpm for 30 minutes. Then the material is cast in the molds and polymerization is carried out according to the prior art.

EXAMPLE 2 (Polyester+0.3% $TiO_2$+ATH) (Invention)

The following components are mixed in a 1000 cc high-density polyethylene container using a screw agitator (900-1800 rpm):
- 420.00 grams of polyester POLYLITE 32166-16 REICHHOLD;
- 6 grams of silane DYNASYLAN MEMO 3(Trimethoxysilyl)propyl methacrylate;

Then the following components are added:
- 3 grams of $TiO_2$ P-25 produced by DEGUSSA;

Minimum mixing time is 2.5 hours and then the following components are added:
- 559.2 grams of ATH (alumina trihydrate) mineral charge with size lower than 50 micron
- 4.00, 3.00, 12.00 grams of cross-linking agents, respectively of EGDM-TEGDM-TMPTM;
- 1.5 g of zinc stearate.

Variable quantities of methacrylic acid and isopropylamine mixtures of approximately 0.06 and 0.07 grams respectively are used as silanization catalysts.

Then, the mineral charge and the Zn-stearate are added and the dispersion is agitated or rolled for at least 6 hours, which is the time needed by the mineral charge for bonding with the silossanic functions that are still free.

Then, 0.5% of Luperox MEKP (Methyl Ethyl Ketone peroxide) polymerization catalyst at 1.5% and 0.15% of stearic acid as releasing agent are added and the solution is agitated at 1800 rpm for 15 minutes. The material is cast in the molds and polymerization is carried out at constant temperature with water at 65° C. for 1 hour; successively, post-curing is made at 90° C. for 8 hours with polymerization according to Table 1.

EXAMPLE 3 (Polyester and MMA Solution+0.3% $TiO_2$+ATH) (Invention)

The following components are mixed in a 1000 cc high-density polyethylene container using a screw agitator (900-1800 rpm):
- 370.00 grams of POLYLITE 32166-16 REICHHOLD polyester;
- 60 grams of high-purity methyl methacrylate;
- 6 grams of silane DYNASYLAN MEMO 3(Trimethoxysilyl)propyl methacrylate;
- 3 grams of $TiO_2$ P-25 produced by DEGUSSA;

Minimum mixing time is 2.5 hours and then the following components are added:
- 549.92 grams of ATH (alumina trihydrate) mineral charge with size lower than 50 micron
- 2.25, 1.5, 6 grams of cross-linking agents, respectively of EGDM-TEGDM-TMPTM;
- 1.20 grams of zinc stearate.

Variable quantities of methacrylic acid and isopropylamine mixtures of approximately 0.06 and 0.07 grams respectively are used as silanization catalysts.

Then, the mineral charge and the Zn-stearate are added and the dispersion is agitated or rolled for at least 6 hours, which is the time needed by the mineral charge for bonding with the silossanic functions that are still free.

Then, 0.5% of Luperox MEKP (Methyl Ethyl Ketone Peroxide) polymerization catalyst at 1.5% and 0.15% of stearic acid as releasing agent are added and the solution is agitated at 1800 rpm for 15 minutes. The material is then cast in the molds and polymerization is carried out at constant temperature with water at 65° C. for 1 hour; successively, post-curing is made at 90° C. for 8 hours with polymerization according to Table 1.

As it can be seen, in all samples of examples 1, 2 and 3, Silane was added in double percentage than $TiO_2$. The $TiO_2$ dispersion and the catalyst disgregation is guaranteed both by the nanometric size of the $TiO_2$ P-25 (average diameter is approx. 21 nm) and by the presence of the silossanic group provided in excess compared to the $TiO_2$.

It was possible to obtain a polymeric material with self-cleaning surface by means of mass dispersion of the $TiO_2$ in the presence of the 3(Trimethoxysilyl)propyl methacrylate silossanic function. The silossanic group allows for anchoring the $TiO_2$ to the structure of the polymeric material, and at the same time acts as disgregating agent.

EXAMPLE 4 (PMMA/MMA (Syrup)+0.3% $TiO_2$+Quartz) (Composition Described in WO2013/017651) with Chemical Catalysis)

The same formulation of EXAMPLE 1 is chemically polymerized with a series of suitable catalysts that start the reaction at ambient temperature. They are:
- TBPM terbutyl peroximaleate produced by Pergan PEROXAN PM-25 in percentage from 0.5% to 2.0%, namely 1%
- Ca(OH)2 in percentage from 0.5%-1.0%, namely 0.6%
- THIOCURE® PETMP Pentaerythritol tetra (3-mercaptopropionate) produced by BRUNO BOCK in percentage from 0.1% to 1.0%, namely 0.2%

EXAMPLE 5 (Polyester and MMA Solution+0.3% $TiO_2$+ATH) (Invention) with Chemical Catalysis)

The same formulation of EXAMPLE 3 is chemically polymerized with a series of suitable catalysts that start the reaction at ambient temperature. The catalysts can be:
- TBPM terbutyl peroximaleate produced by Pergan PEROXAN PM-25 in percentage from 0.5% to 2.0%, namely 1%
- Ca(OH)2 in percentage from 0.5-1.0%, precisely 0.6%
- THIOCURE® PETMP Pentaerythritol tetra (3-mercaptopropionate) produced by BRUNO BOCK in percentage from 0.1% to 1.0%, namely 0.2%

Comparative Tests on Polymerized-Composite Samples

1. $TiO_2$ Photocatalytic Activity

The photocatalytic activity was checked by assessing the decoloration of the following organic coloring agents, such as eosin and methylene blue, which simulate the natural coloring agents that are mostly used in cooking, such as wine, vinegar, strawberries, and other staining agents, which are placed on the composite surface.
a) Self-cleaning of surfaces stained with eosin;
b) Self-cleaning of surfaces stained with methylene blue;

The self-cleaning of surfaces stained with eosin and methylene blue allows for assessing the degradation capacity of $TiO_2$ against some coloring agents, such as eosin and methylene blue.

The photocatalytic activity of the composite of examples 1 and 4, 2 and 3 and 5 (0.3% of photocatalytic $TiO_2$ and mineral charges) was checked. The photocatalytic activity was checked by immersing the composite of examples 1 and 4, 2 and 3 and 5 (0.3% of photocatalytic $TiO_2$) in a 0.0025 M solution of methylene blue and eosin Y and measuring the time needed to degrade said coloring agents. Degradation was made using a Xenon lamp (SolarBox 1500 and 25 mW/cm$^2$, λ=280-400 nm, outdoor filter) and coloring was monitored with colorimetric measurements (Color I7 X-Rite). Measurements were made after 60, 90, 150, 210, and 270 minutes of exposure and the colorimetric variation was expressed in function of ΔE.

TABLE 2

| METHYLENE BLUE DEGRADATION | | ΔE time 0 min | ΔE time 50 min | ΔE time 100 min | ΔE time 150 min | ΔE time 200 min | ΔE time 250 min |
|---|---|---|---|---|---|---|---|
| EXAMPLE 1 and 4 | Syrup composite + 0.3% TiO2 + QUARTZ | 0 | 10 | 12 | 13 | 14 | 15 |
| EXAMPLE 2 | Polyester composite + 0.3% TiO2 + ATH | 0 | 11 | 13 | 14 | 15 | 16 |
| EXAMPLE 3 and 5 | Polyester-MMA composite + 0.3% 0.3% TiO2 + ATH | 0 | 12 | 13 | 15 | 16 | 17 |

Figure 2:
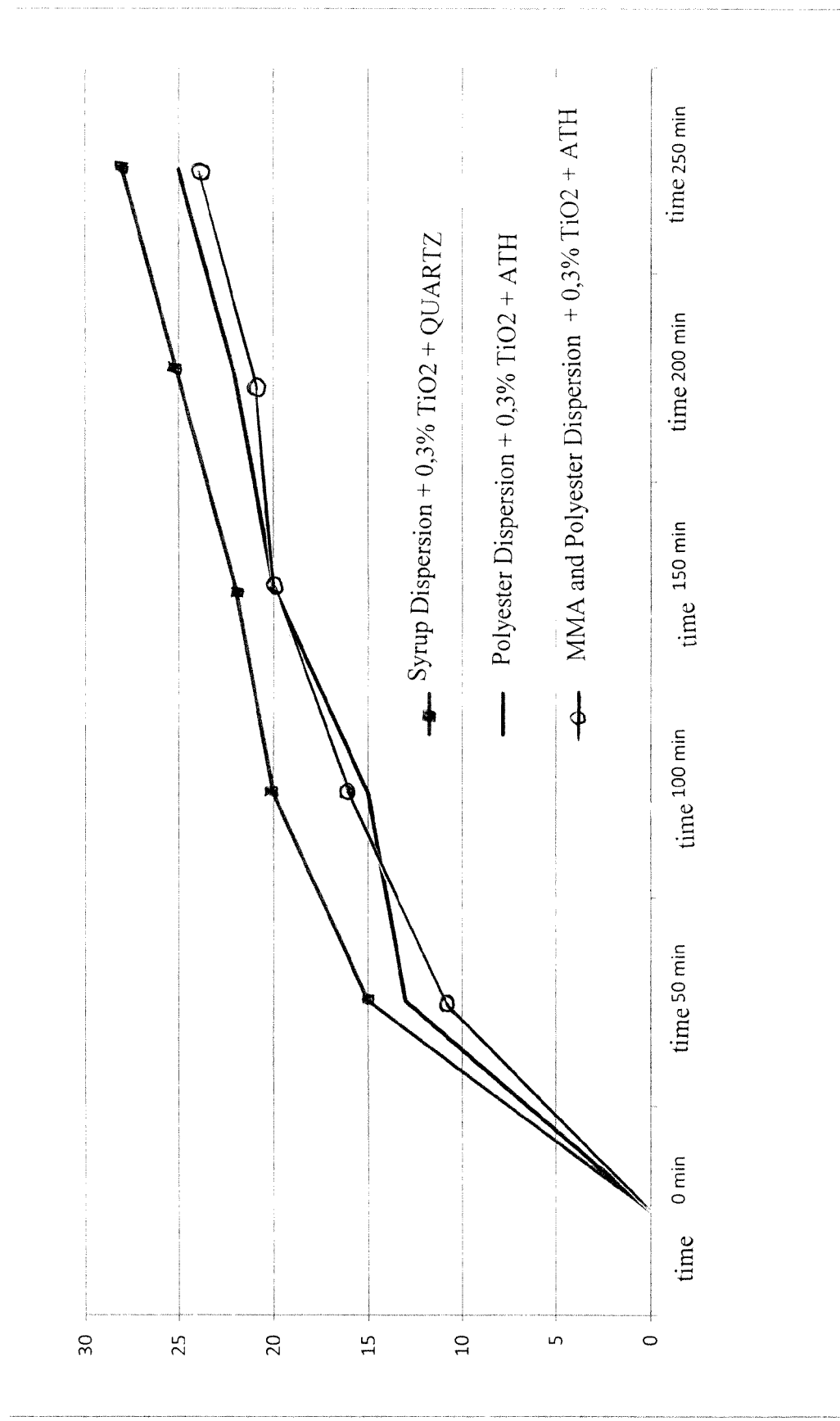
FIG. 2 is a chart that shows the trend of ΔE of methylene blue, measured with colorimeter in three samples, after exposure to a Xenon lamp.

Table 2 and FIG. 2 show the degradation of methylene blue of a composite sample from example 1 and 4, of a sample from example 2 and of a sample from example 3 and 5 (0.3% of photocatalytic $TiO_2$ and mineral charges).

TABLE 3

| DEGRADATION WITH EOSINE | | ΔE time 0 min | ΔE time 50 min | ΔE time 100 min | ΔE time 150 min | ΔE time 200 min | ΔE time 250 min |
|---|---|---|---|---|---|---|---|
| EXAMPLE 1 and 4 | Syrup composite + 0.3% TiO2 + QUARTZ | 0 | 15 | 20 | 22 | 25 | 28 |
| EXAMPLE 2 | Polyester composite + 0.3% TiO2 + ATH | 0 | 13 | 15 | 20 | 22 | 25 |
| EXAMPLE 3 and 5 | Polyester-MMA composite + 0.3% TiO2 +ATH | 0 | 11 | 16 | 20 | 21 | 24 |

Figure 3:
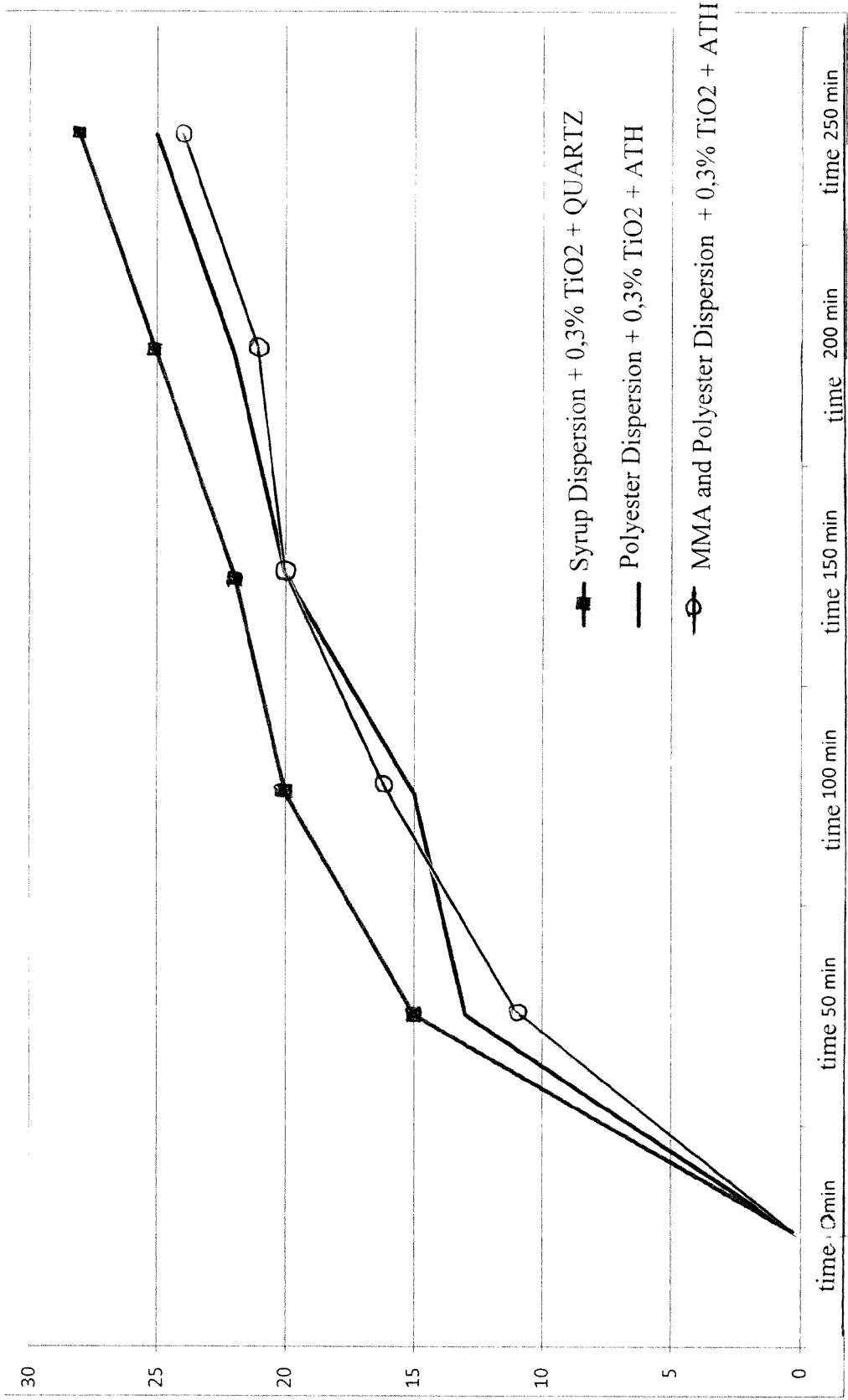
FIG. 3 is a chart that shows the trend of ΔE of eosin, measured with colorimeter, in three samples after exposure to a Xenon lamp.

Table 3 and FIG. 3 show the eosin degradation of a sample from example 1 and 4, of a sample from example 2 and of a sample from example 3 and 5 (0.3% of photocatalytic $TiO_2$ and mineral charges).

Based on the test results, coloring agents are degraded by $TiO_2$; this is a very important result because it allows for defining the surface of material from examples 1 and 4, 2 and 3 and 5 as self-cleaning; moreover, it confirms that $TiO_2$ had bonded to the structure of the polyester resin of examples 2 and 3 and 5, according to the invention, because $TiO_2$ emerges to the surface as in example 1 on methacrylic syrup, according to the prior art.

In all tests the materials that contained $TiO_2$ showed a high dispersion and homogeneity of $TiO_2$, without decantation phenomena, as shown by the chromatic coordinates, that is to say the color variation of the dispersion to assess the dispersion homogeneity in the tests of Table 4 below.

TABLE 4

| | | ΔE |
|---|---|---|
| EXAMPLE 1 WO2013/017651 | Syrup composite + 0.3% TiO2 + QUARTZ | 0.50 |
| EXAMPLE 2 Invention | Polyester composite + 0.3% TiO2 + ATH | 0.60 |
| EXAMPLE 3 Invention | Polyester-MMA composite + 0.3% TiO2 + ATH | 0.40 |
| EXAMPLE 4 WO2013/017651 | Syrup composite + 0.3% TiO2 + QUARTZ chemical catalysis | 0.50 |
| EXAMPLE 5 Invention | Polyester-MMA composite + 0.3% TiO2 + ATH chemical catalysis | 0.40 |

2. Viscosity Variation with Silane Addition

The viscosity of samples from examples 1, 2 and 3 with Silane and TiO2 in 1:2 ratio, at 0 time, at 60 minutes and at 120 minutes was measured in order to assess the chemical bond of Silane with the polyester resin.

Figure 4:
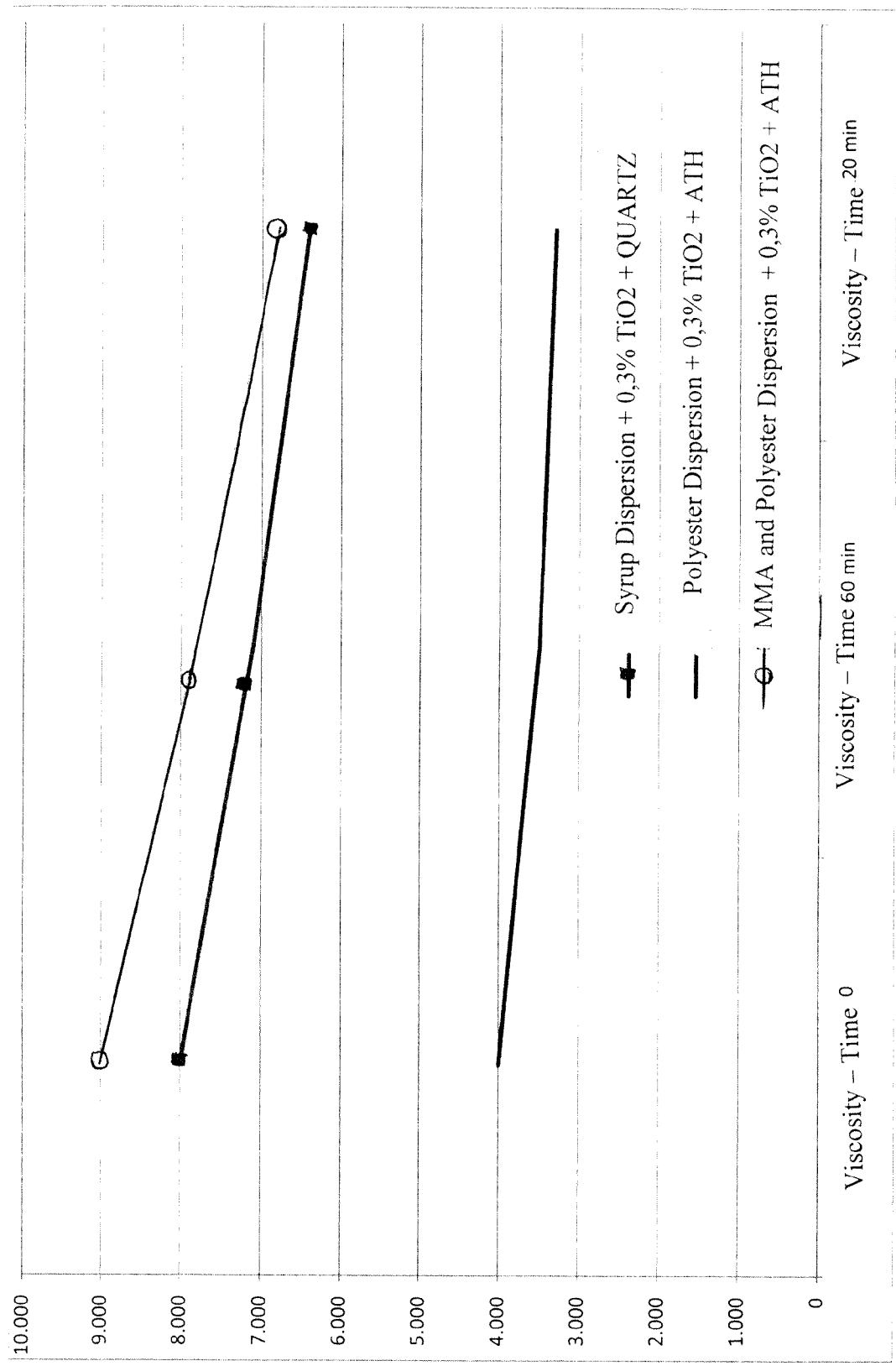
FIG. 4 is a chart that shows the viscosity trend in three samples over time.

An evident variation of the resin viscosity is found after adding silane to a polyester resin or to a polyester resin and MMA with the addition of $TiO_2$. Such a variation confirms the presence of direct interaction phenomena between $TiO_2$ and silane. The measurement of $TiO_2$ silanization time through the viscosity value of dispersions with different addition of silane gave the results shown in Table 5 and in FIG. 4 below.

TABLE 5

| VISCOSITY | | Cps Viscosity time 0 | Cps Viscosity time 60 min | Cps Viscosity time 120 min |
|---|---|---|---|---|
| EXAMPLE 1 | Syrup dispersion + 0.3% TiO2 + QUARTZ | 8,000 | 7,100 | 6,400 |
| EXAMPLE 2 | Polyester dispersion + 0.3% TiO2 +ATH | 4,000 | 3,500 | 3,300 |
| EXAMPLE 3 | Polyester dispersion MMA + 0.3% TiO2 + ATH | 9,000 | 7,800 | 6,800 |

The viscosity values were measured at a temperature of approximately 20° C. As shown in Table 5 and FIG. 4, all the examples show a clear variation of viscosity when silane is added, this being an evident sign that a chemical bond is established. Data shows that the higher viscosity reduction is more evident after the first 60 minutes, this being a clear sign that the chemical bond is established within such a period of time.

3. Visible Cross-Linking on the Surface of the Finished Product

In this test the finished products are sinks obtained from the dispersions of examples 1, 2 and 3. Cross-linking is visible with the naked eye in the three finished products because the sink surfaces show a very reticulated and very matt surface with a very high aesthetic appeal. Such a surface is very different from the surfaces that do not contain titanium dioxide bonded with silence, which are on the contrary very polished, with non-homogeneous opacity and poor cross-linking.

4. Hardness and Thermoformability

Hardness and thermoformability tests were carried out on the samples of examples 1, 2, 3, 4 and 5, as respectively shown in Table 6 and 7 below. Hardness was measured in HRM.

TABLE 6

| | HARDNESS | HRM |
|---|---|---|
| EXAMPLE 1 | Syrup composite + 0.3% TiO2 + QUARTZ | 105.00 |
| EXAMPLE 2 | Polyester composite + 0.3% TiO2 + ATH | 90.00 |
| EXAMPLE 3 | Polyester-MMA composite + 0.3% TiO2 + ATH | 92.00 |
| EXAMPLE 4 | Syrup composite + 0.3% TiO2 + QUARTZ chemical catalysis | 104.00 |
| EXAMPLE 5 | Polyester-MMA composite + 0.3% TiO2 + ATH chemical catalysis | 93.00 |

As shown in Table 6, the samples of examples 2 and 3 and 5 according to the invention have low hardness features compared to the sample of example 1 according to the prior art. For this reason, samples 2 and 3 and 5 are easy to work, whereas samples 1 and 4 are difficult to work.

TABLE 7

| | THERMOFORMABILITY | Bending degree |
|---|---|---|
| EXAMPLE 1 and 4 | Syrup composite + 0.3% TiO2 + QUARTZ | 0° |
| EXAMPLE 2 | Polyester composite + 0.3% TiO2 + ATH | 25° |
| EXAMPLE 3 and 5 | Polyester-MMA composite + 0.3% TiO2 + ATH | 24° |

As shown in Table 7, the samples of examples 2 and 3 and 5 according to the invention have a bending degree higher than 20°, whereas the sample of example 1-4 has no bending degree. The bending degree is the angle that can be formed from a flat surface that is considered as angle 0°.

Therefore, samples 2a and 3 and 5 are thermoformable, whereas samples 1 and 4 are not thermoformable.

Numerous variations and modifications can be made to the present embodiments of the invention, which are within the reach of an expert of the field, falling in any case within the scope of the invention as disclosed by the attached claims.

The invention claimed is:

1. A self-cleaning composite material comprising:
  50-85% by weight of mineral charges;
  10-30% by weight of polymer;
  photocatalytic titanium dioxide (TiO2);
  a compatibilizing agent for anchoring between the photocatalytic TiO2 and the polymer, wherein said anchoring compatibilizing agent of the photocatalytic TiO2 is silane; and
  cross-linking monomers that cross-link the polymer, wherein said mineral charges comprise alumina trihydrate (ATH), and said cross-linking polymer comprises polyester resin, wherein the photocatalytic titanium dioxide is dispersed in the cross-linked polymer in a weight percentage of 0.05%-5% with respect to a weight of the cross-linked polymer.

2. The self-cleaning composite material of claim 1, wherein said alumina trihydrate (ATH) has a grain size of 10-50 microns.

3. The self-cleaning composite material of claim 1, wherein methyl methacrylate (MMA) is added to said polyester resin in a weight percentage lower than 15% of the weight of the polyester resin and a methyl methacrylate (MMA) mixture.

4. The self-cleaning composite material of claim 1, wherein said silane is 3-(trimethoxysilyl) propyl methyl methacrylate and said silane is in a double quantity with respect to the photocatalytic TiO2.

5. The self-cleaning composite material of claim 1, further comprising:
  silanization catalysts.

6. The self-cleaning composite material of claim 1, wherein said photocatalytic titanium dioxide is in an anatase form and in a powder with a grain size lower than 300 nm.

7. The self-cleaning composite material of claim 1, wherein said crosslinking monomers comprise ethylene glycol dimethacrylate (EGDM), tetraethylene glycol methacrylate (TEGDM) and trimethylolpropane trimethacrylate (TMPTMA).

8. The self-cleaning composite material of claim 1, further comprising:
fine particles of a silicate with a grain size lower than 0.1 mm, in a weight percentage between 2% and 15% with respect to the weight of the total composite material.

9. A production process for a self-cleaning composite material, the production process comprising:
preparing a polyester resin in a quantity corresponding to 10%-30% of a final product weight;
dispersing silane in the polyester resin;
agitating the polyester resin and the silane;
dispersing photocatalytic titanium dioxide (TiO2) in the polyester resin and the silane, in a weight percentage of 0.05%-5% with respect to a weight of the polyester resin;
agitating the polyester resin, the silane and the titanium dioxide (TiO2);
adding 50%-85% in weight of alumina trihydrate (ATH)-based mineral charges and cross-linking monomers to the polyester resin, the silane and the photocatylitic titanium dioxide in order to obtain a reticulation of the polyester resin;
agitating the final mixture; and
polymerizing the mixture in a mold.

10. The process of claim 9, wherein said silane is added in a double quantity with respect to the photocatalytic TiO2.

11. The process of claim 9, wherein the agitating of the polyester resin and the silane the agitating of the polyester resin, silane and titanium dioxide (TiO2) mixture are made with a screw agitator at a speed of between 900 rpm and 1800 rpm respectively for a time of 30 minutes and 2.5 hours before the step of adding.

12. The process of claim 9, wherein step of polymerizing in the mold is made at an initial temperature of 50° C. that increases gradually to 100° C. for a time of 8 hours.

13. The process of claim 9, wherein step of polymerizing is performed chemically, at room temperature, by one or more of TBPM (Tert-Butyl Peroxymaleate) in a percentage from 0.5% to 2.0%,
Ca(OH)2 (calcium hydroxide) in a percentage from 0.5% to 1.0%,
PETMP Pentaerythritol Tetra(3-mercaptopropionate) in a percentage from 0.1% to 1.0%.

* * * * *